Dec. 6, 1927.
S. L. WALKER
1,651,490
THERMOMETER ATTACHMENT
Filed Dec. 24, 1926
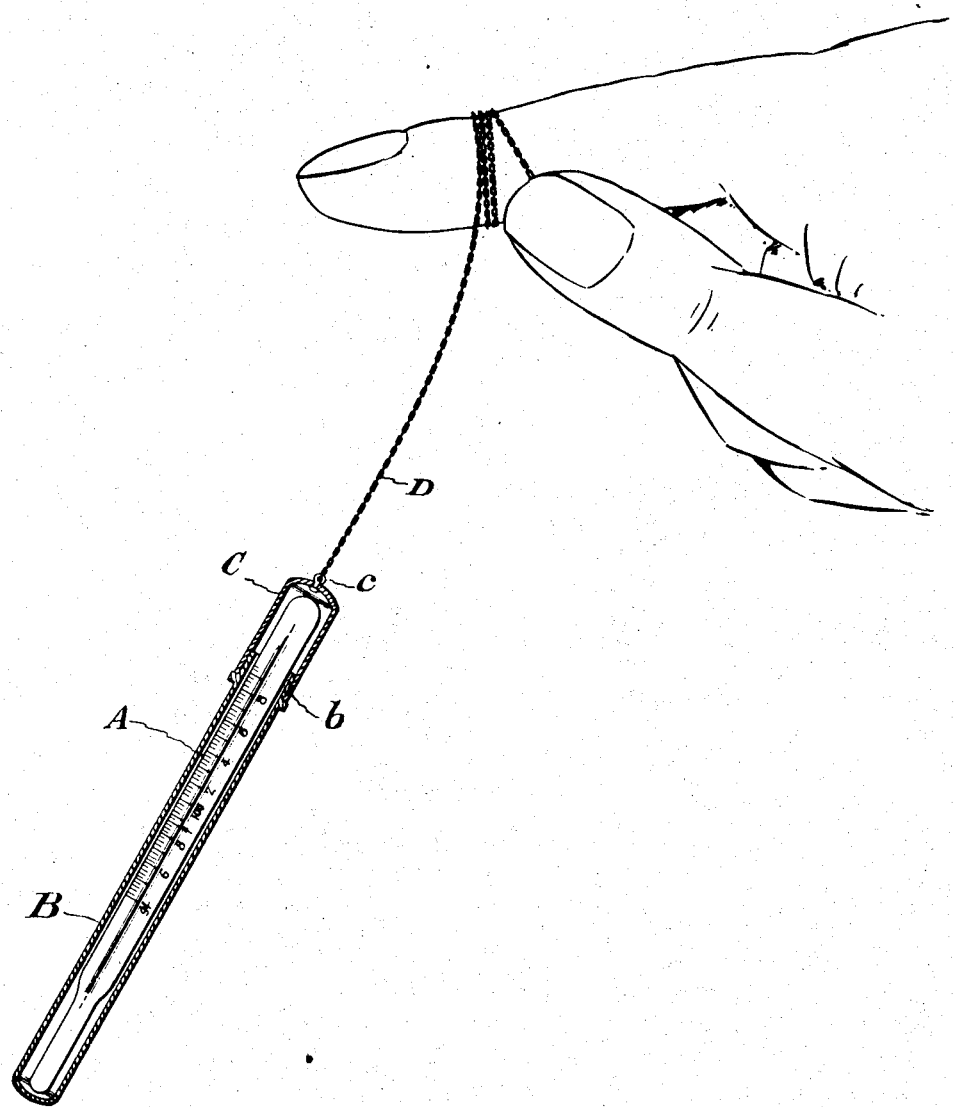
Inventor
Samuel L. Walker
By Dowell & Dowell
his Attorneys Patented Dec. 6, 1927.

1,651,490

UNITED STATES PATENT OFFICE.

SAMUEL L. WALKER, OF CHARLESTON, WEST VIRGINIA; CYNTHIA ST. CLAIR WALKER EXECUTRIX OF SAID SAMUEL L. WALKER, DECEASED.

THERMOMETER ATTACHMENT.

Application filed December 24, 1926. Serial No. 156,915.

This invention relates to thermometers, and more particularly to clinical thermometers.

It is a common practice with users of clinical thermometers, in order to cause the mercury to settle down or recede to normal, after taking the temperature of a patient, to tap the instrument against the palm of the hand or give it a quick movement as if to throw it while holding it by grasping one end, and as a result of such methods it frequently happens that the thermometer is broken by tapping the bulb against the hand in a sidewise position, or by a sudden thrust with such force as to release the grasp of the user and throw the instrument against a solid wall or on the floor.

The object of my invention is to provide simple, efficient and inexpensive means for easily and quickly causing the mercury to settle down or recede to normal, without liability of breaking the instrument by subjecting it to the aforesaid methods of using such easily broken devices.

The invention will first be hereinafter more particularly described, with reference to the accompanying drawings, which are to be taken as a part of this specification, and then pointed out in the claims at the end of the description.

In the illustrated embodiment of my invention, I have shown an ordinary thermometer housed within a case or enclosure from which it may be easily removed for use in taking the temperature of a patient; said case having means associated therewith for imparting to the thermometer within the case a whirling movement by which the mercury may be caused to settle down or recede to normal.

The thermometer, denoted by the letter A, may be of any suitable construction adapted to be housed within a suitable case having a detachable cap to permit the thermometer to be easily removed and replaced at will. In the form shown, the case consists of a main portion B, of tubular form and of a length a little less than the length of the thermometer inserted therein and having a threaded end portion $b$ on which is screwed a cap C, to which is secured one end of a chain or cord D, by which the case with the thermometer housed therein may be gently whirled around in a circular path until the chain or cord is wrapped one or more times around the finger; said chain or cord being preferably of such length that the free end thereof may be wrapped around the forefinger and grasped between said finger and the thumb and so held that as the thermometer is whirled around it may move in a path describing successively circles which gradually decrease in diameter toward the end of the movement, so as to avoid the danger of breakage incident to whirling the thermometer around in a circle concentric with the point at which the free end of the chain is held and suddenly stopping the whirling movement. The chain or cord may also serve as a safety device for fastening the thermometer to the garment of the wearer and thus prevent dropping or losing the same. The chain is also preferably attached to the cap of the thermometer case by a swivel connection as at $c$ so as to prevent twisting the chain by rotation of the case during the whirling movement. By making the case or enclosure separable from and independent of the thermometer, no special construction of either the case or the thermometer is required, and the thermometer may be of any ordinary construction adapted to be enclosed within the case, and the construction of the latter is very simple and the invention can be utilized with very little additional expense as compared with cases ordinarily used to enclose thermometers of the type to which my invention is applied.

This simple and inexpensive device will be found very convenient for use by invalids or other persons having occasion to use a clinical thermometer, especially persons affected with diseases requiring frequent use of a thermometer for ascertaining the temperature of the person affected.

Having thus described my invention, what I claim as new and desire to secure by Letters Patent of the United States is:

A device of the character described comprising in combination a thermometer-enclosing casing adapted to contain a thermometer for the purpose of whirling the same without causing rotation on its axis, and flexible means for imparting a whirling movement to the casing attached to one end of the same and adapted to be wound on the finger as a result of said whirling motion; said casing having a swiveled connection at one end with said means, whereby said casing is not rotated on its axis during the winding of the entire length of the flexible means on the finger.

In testimony whereof I affix my signature.

SAMUEL L. WALKER.